US008787629B2

(12) United States Patent
Kaneda et al.

(10) Patent No.: US 8,787,629 B2
(45) Date of Patent: Jul. 22, 2014

(54) IMAGE PROCESSING BASED ON LINE-OF-SIGHT OF A PERSON

(75) Inventors: Yuji Kaneda, Kawasaki (JP); Kotaro Yano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 175 days.

(21) Appl. No.: 13/446,898

(22) Filed: Apr. 13, 2012

(65) Prior Publication Data

US 2012/0269405 A1    Oct. 25, 2012

(30) Foreign Application Priority Data

Apr. 21, 2011    (JP) .................................. 2011-095283

(51) Int. Cl.
*G06K 9/00*    (2006.01)

(52) U.S. Cl.
USPC ............................ 382/118; 382/103; 382/117

(58) Field of Classification Search
None
See application file for complete search history.

(56) References Cited

U.S. PATENT DOCUMENTS

| 7,699,423 | B2 | 4/2010 | Suwa et al. |
| 7,881,524 | B2 | 2/2011 | Matsugu et al. |
| 7,936,902 | B2 * | 5/2011 | Kinoshita ..................... 382/103 |
| 8,055,023 | B2 * | 11/2011 | Goto et al. ................... 382/104 |
| 8,130,281 | B2 | 3/2012 | Kaneda et al. |
| 2006/0115157 | A1 | 6/2006 | Mori et al. |
| 2009/0089235 | A1 | 4/2009 | Torii et al. |
| 2009/0324060 | A1 | 12/2009 | Sato et al. |
| 2012/0033853 | A1 | 2/2012 | Kaneda et al. |
| 2012/0063639 | A1 | 3/2012 | Yano |
| 2012/0092495 | A1 | 4/2012 | Yano |
| 2012/0148159 | A1 | 6/2012 | Kaneda et al. |

FOREIGN PATENT DOCUMENTS

| JP | 09-081732 A | 3/1997 |
| JP | 2001-051338 A | 2/2001 |
| JP | 2004-118731 A | 4/2004 |
| JP | 2006-293909 A * | 10/2006 |
| JP | 2007-265367 A | 10/2007 |
| JP | 2008-210239 A | 9/2008 |

OTHER PUBLICATIONS

U.S. Appl. No. 13/459,021, filed Apr. 27, 2012, Applicants: Takashi Suzuki, et al.
U.S. Appl. No. 13/461,585, filed May 1, 2012, Applicant: Kotaro Yano.

(Continued)

*Primary Examiner* — Bhavesh Mehta
*Assistant Examiner* — Siamak Harandi
(74) *Attorney, Agent, or Firm* — Fitzpatrick, Cella, Harper & Scinto

(57) ABSTRACT

An information processing apparatus includes a face detection unit configured to detect a face of a person from an image; a storage unit configured to store dictionary data which holds information relating to faces and line-of-sight correction data corresponding to respective persons; an authentication unit configured to authenticate a person corresponding to the face detected by the face detection unit, using the information relating to faces in the dictionary data; a line-of-sight detection unit configured to detect information relating to a line of sight from the face detected by the face detection unit; and a line-of-sight correction unit configured to correct the information relating to a line of sight detected by the line-of-sight detection unit, using the line-of-sight correction data in the dictionary data corresponding to the person authenticated by the authentication unit.

9 Claims, 15 Drawing Sheets

(56) References Cited

OTHER PUBLICATIONS

Chan, et al., "Multi-scale Local Binary Pattern Histogram for Face Recognition", ICB, vol. 4642 of Lecture Notes in Computer Science, pp. 809-818, 2008.

P. Viola, et al., "Rapid Object Detection using a Boosted Cascade of Simple Features", CVPR, vol. 1, pp. 511-518, Dec. 2001.

Mitarai, et al., "Robust Face Detection System Based on Convolutional Neural Networks Using Selective Activation of Modules", FIT, L1-013, 2003.

Bertozzi, et al., "A Pedestrian Detector Using Histograms of Oriented Gradients and a Support Vector Machine Classifier", IEEE Intelligent Transportation Systems Conference, 2007.

Cootes, et al., "Active Appearance Models", vol. 23, No. 6, pp. 484-498, Springer, 1998.

Turk, et al., "Face Recognition Using Eigenfaces", IEEE Conf. CVPR, pp. 586-591, 1991.

V. Vapnik, "Statistical Learning Theory", John Wiley & Sons, 1998.

* cited by examiner

FIG. 3
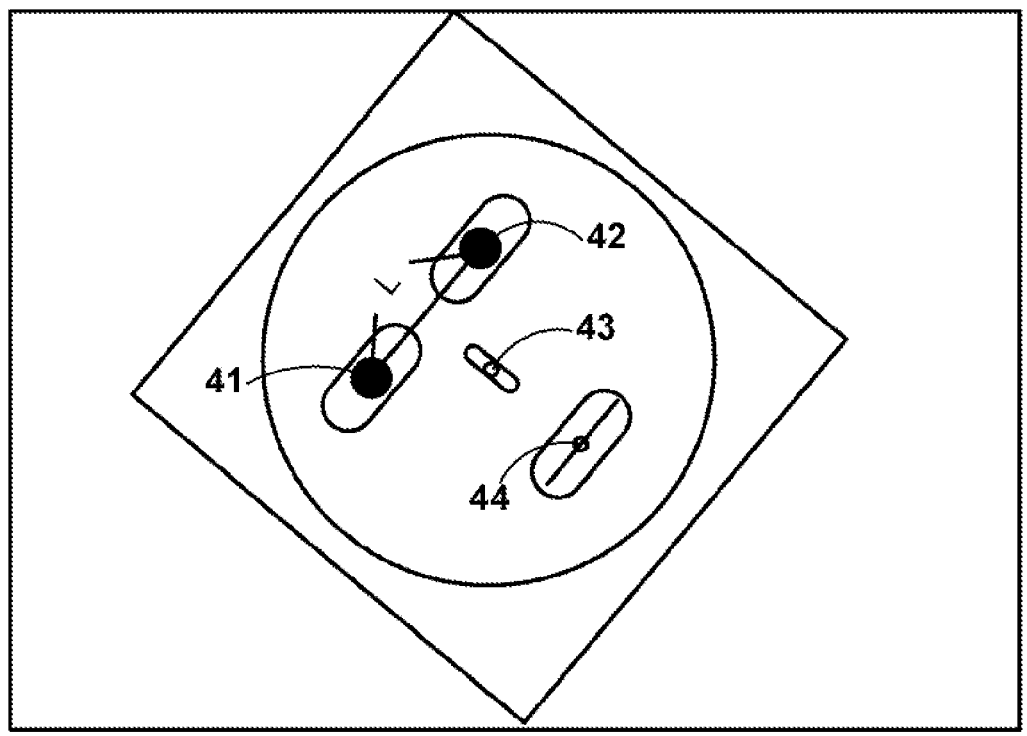
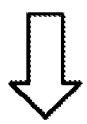
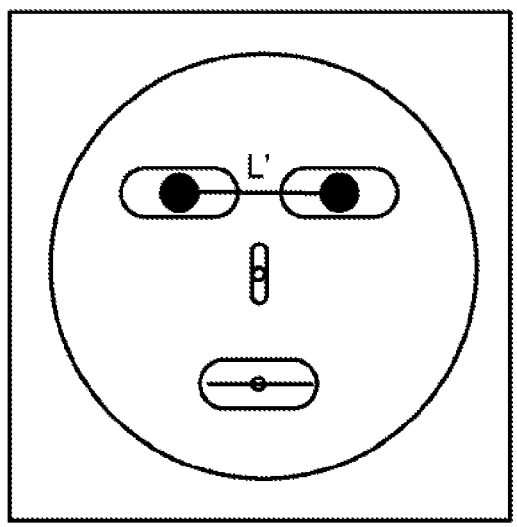

FIG. 6A

| FACE ID | LINE-OF-SIGHT CORRECTION FLAG | LINE-OF-SIGHT CORRECTION ORIENTATION a (θ1 DIRECTION) | LINE-OF-SIGHT CORRECTION ORIENTATION b (θ2 DIRECTION) | FACIAL IMAGE |
|---|---|---|---|---|
| 1 | 1 | 5° | 0° | |
| 2 | 0 | — | — | |
| 3 | — | — | — | |

FIG. 6B

| FACE ID | LINE-OF-SIGHT CORRECTION FLAG | LINE-OF-SIGHT CORRECTION ORIENTATION a (θ1 DIRECTION) | LINE-OF-SIGHT CORRECTION ORIENTATION b (θ2 DIRECTION) | FACIAL IMAGE |
|---|---|---|---|---|
| 1 | 1 | 5° | 0° | |
| 2 | 0 | — | — | |
| 3 | — | — | — | |

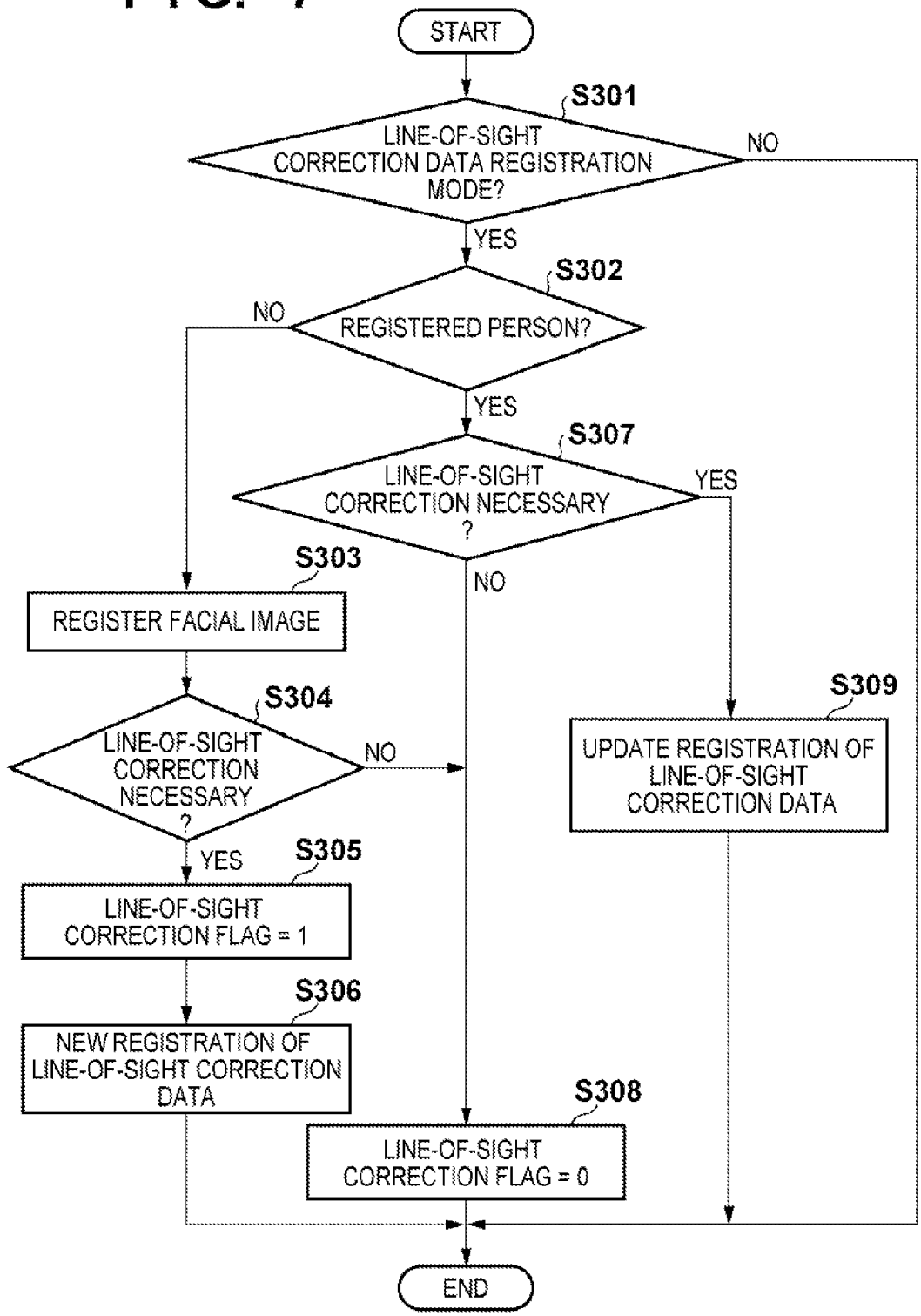

| FACE ID | LINE-OF-SIGHT CORRECTION FLAG | SIZE L' OF FACE | FACE ORIENTATION α1 | FACE ORIENTATION α2 | FACIAL IMAGE |
|---|---|---|---|---|---|
| 1 | 1 | 60 | 0° | 0° | |
| 2 | 0 | 40 | 30° | 0° | |
| 3 | 1 | 40 | 10° | 0° | |

FIG. 8A

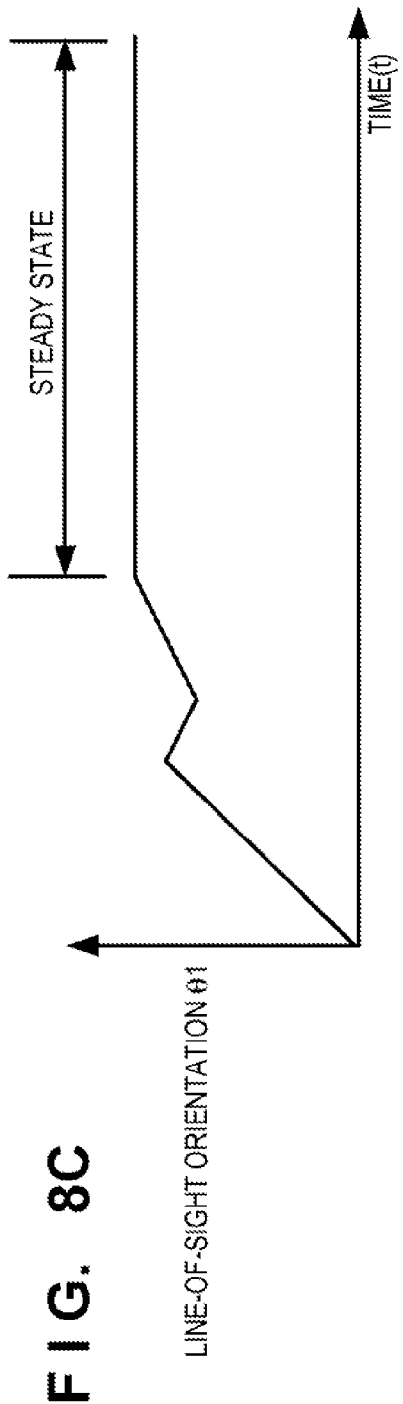

IMAGE PROCESSING BASED ON LINE-OF-SIGHT OF A PERSON

BACKGROUND OF THE INVENTION

1. Field of the Invention

The present invention relates to an information processing apparatus, a processing method for the same, a non-transitory computer-readable storage medium and an image capturing apparatus.

2. Description of the Related Art

Techniques for detecting the line of sight of a person are known. In the technique disclosed in Japanese Patent Laid-Open No. 2008-210239 (referred to below as Document 1), the contour of a face and a plurality of locations, such as the eyes and the like, are detected from edges or the like, and the orientation of the face is detected based on their positional relation. Furthermore, the line of sight of a driver can be detected by detecting the positions of the pupils, taking a camera that is installed in a vehicle as a reference. Moreover, in the technique disclose in Japanese Patent Laid-Open No. 09-081732 (referred to below as Document 2), an eye region is detected using an energy model, and a line of sight is detected by comparing this eye region with a predetermined image dictionary.

Japanese Patent Laid-Open No. 2006-293909 (referred to below as Document 3) describes a technique for detecting a line of sight that takes into account the influence individual differences known as the dominant eye. In the technique disclosed in Document 3, the line of sight of a driver is detected based on pre-registered information that indicates whether the left or the right eye is the dominant eye, on the premise that the orientation of the driver's face is facing straight ahead. Furthermore, Japanese Patent Laid-Open No. 2001-051338 (referred to below as Document 4) describes a technique relating to an image capturing apparatus that utilizes such a technique for detecting lines of sight. With the technique disclosed in Document 4, image capturing is carried out when the line of sight of an object faces in the camera direction.

As shown in FIG. 13A, the direction (orientation) of the line of sight of an object taking a predetermined direction as a reference can be represented as a line-of-sight direction ($\theta1$, $\theta2$). Moreover, as shown in FIG. 13B, the line-of-sight orientation ($\theta1$, $\theta2$) of the object can also be represented by the orientation ($\alpha1$, $\alpha2$) of the face and the orientation ($\beta1$, $\beta2$) of the eyes. There is a possibility that shifts due to individual differences occur in the orientation ($\alpha1$, $\alpha2$) of the face and the orientation ($\beta1$, $\beta2$) of the eyes, which are necessary in order to detect the line-of-sight orientation ($\theta1$, $\theta2$) of the object.

Here, several examples of such individual differences are given. An example of a first individual difference is differences in the size of facial organs, such as the facial bones, eyes (pupils) or mouth, as well as differences in the positional relationship of these facial organs, as shown in FIG. 14A. The orientation ($\alpha1$, $\alpha2$) of the face and the orientation ($\beta1$, $\beta2$) of the eyes are often detected utilizing averaged positional relationships of such facial organs as the eyes (pupils) or the mouth, or averaged dictionary data serving as a model. Therefore, when face whose line of sight is to be detected deviates from the averaged positional relationship of the facial organs or the averaged dictionary data, then there is a possibility that a shift occurs in the orientation ($\alpha1$, $\alpha2$) of the face or the orientation ($\beta1$, $\beta2$) of the eyes.

An example of a second individual difference is the dominant eye. It is said that people use the field of vision obtained with one eye as the main visual information. The eye with that obtains this main visual information is called the "dominant eye." Therefore, it is said that if a person looks at a predetermined object, the dominant eye looks in the direction of that predetermined object, but the other eye looks in a direction that is shifted slightly away from the direction of the predetermined object. For example, even though the two people shown in FIG. 14B look straight ahead, in the person on the left in FIG. 14B, the right pupil is located at the center of the eye region, but the left pupil is located to the left from the center of the eye region. Similarly, in the person on the right in FIG. 14B, the left pupil is located at the center of the eye region, but the right pupil is located to the right from the center of the eye region. Furthermore, there are also people with no constant dominant eye, whose dominant eye alternates between left and right. Due to individual differences in the dominant eye, shifts occur in the orientation ($\beta1$, $\beta2$) of the eyes.

If such a line-of-sight detection technique is applied to various types of apparatuses, then several problems may occur due to these individual differences. For example, if applied to an image capturing apparatus that automatically performs image capturing when the line-of-sight orientation faces in the camera direction, there is a possibility that the problem occurs that no image is captured even though the object looks in the camera direction. Moreover, if applied to an in-vehicle apparatus for sounding an alarm upon the detection of look-away, there is the possibility that look-away is erroneously detected and the alarm may be sounded continuously, even though the object looks straight ahead.

SUMMARY OF THE INVENTION

The present invention provides a technique with which the orientation of a line of sight can be detected with high precision without suffering the influence of individual differences.

According to a first aspect of the present invention, there is provided an information processing apparatus comprising: a face detection unit configured to detect a face of a person from an image; a storage unit configured to store dictionary data which holds information relating to faces and line-of-sight correction data corresponding to respective persons; an authentication unit configured to authenticate a person corresponding to the face detected by the face detection unit, using the information relating to faces in the dictionary data; a line-of-sight detection unit configured to detect information relating to a line of sight from the face detected by the face detection unit; and a line-of-sight correction unit configured to correct the information relating to a line of sight detected by the line-of-sight detection unit, using the line-of-sight correction data in the dictionary data corresponding to the person authenticated by the authentication unit.

According to a second aspect of the present invention, there is provided an image capturing apparatus which includes the information processing apparatus according to the above-described information processing apparatus, the apparatus comprising: a determination unit configured to determine whether a line of sight of a person serving as an object whose image is to be captured faces toward the image capturing apparatus, based on the information relating to a line of sight that is output from the line-of-sight correction unit; and an image capturing control unit configured control an execution of image capturing based on a result of the determination with the determination unit.

According to a third aspect of the present invention, there is provided a processing method of an image processing apparatus, the processing method comprising: detecting a face of a person from an image; authenticating a person corresponding to the detected face, using information relating to the face in dictionary data which holds information relating to faces and line-of-sight correction data corresponding to respective persons; detecting information relating to a line of sight from the detected face; and correcting the information relating to the detected line of sight, using the line-of-sight correction data in the dictionary data corresponding to the authenticated person.

Further features of the present invention will be apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 3 is a diagram illustrating an example of a line-of-sight detection process.

FIGS. 6A and 6B are diagrams showing an example of the dictionary data.

FIG. 7 is a flowchart showing an example of the processing flow of the line-of-sight correction data registration process shown in S109 of FIG. 2.

FIGS. 8A to 8C are diagrams illustrating an example of the processing conditions of S306 and S309 in FIG. 7.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

Embodiment 1

Figure 1:
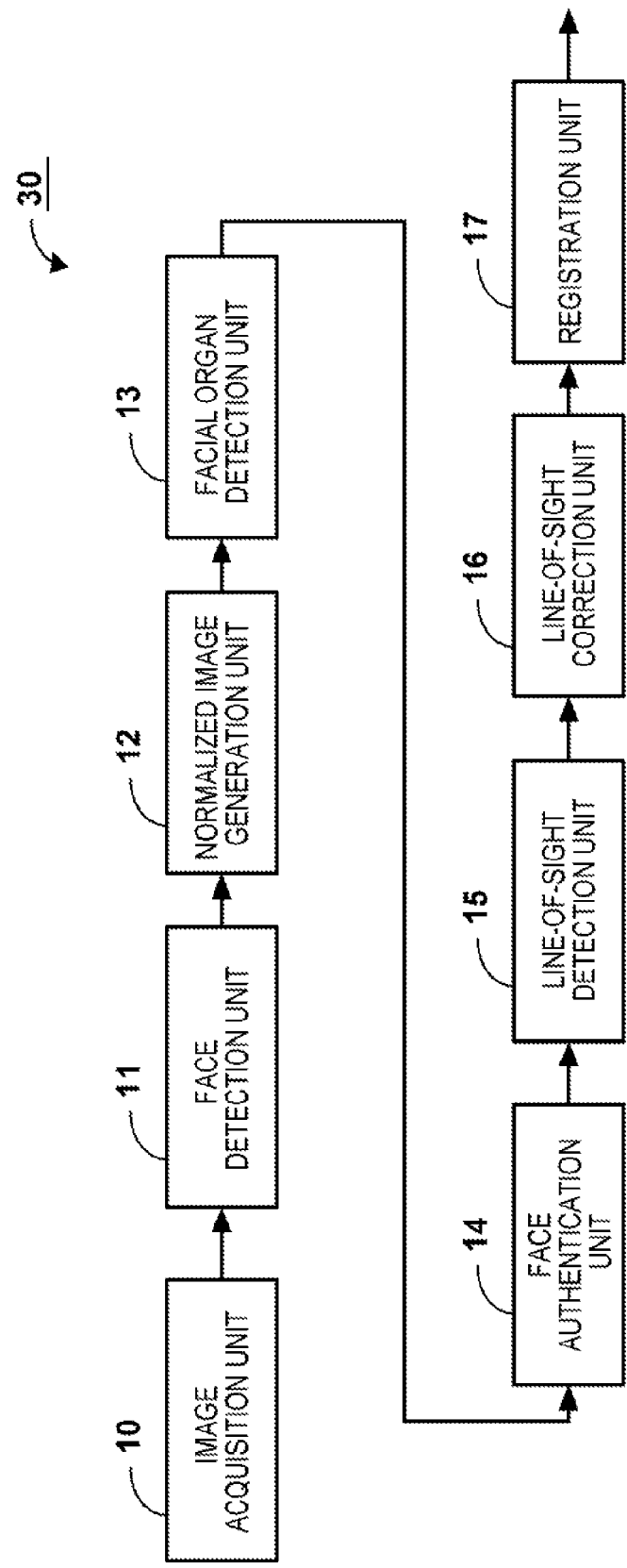
FIG. 1 is a diagram showing an example of the functional configuration of an information processing apparatus 30 according to one embodiment of the present invention.

FIG. 1 is a diagram showing an example of the functional configuration of an information processing apparatus 30 according to one embodiment of the present invention.

The information processing apparatus 30 includes, as its functional configuration, an image acquisition unit 10, a face detection unit 11, a normalized image generation unit 12, a facial organ detection unit 13, a face authentication unit 14, a line-of-sight detection unit 15, a line-of-sight correction unit 16, and a registration unit 17.

The image acquisition unit 10 acquires an image. The image is acquired, for example, via an interface from an image capturing apparatus, such as a compact digital camera or a digital single-lens reflex camera, or a non-volatile memory, such as a hard-disk drive or a flash memory.

The face detection unit 11 detects the face of a person from the image acquired with the image acquisition unit 10. The normalized image generation unit 12 cuts out a facial region that has been detected with the face detection unit 11, and carries out an affine transformation so that the size of the face is turned into a predetermined size and the orientation of the face is formed into an erect orientation.

The facial organ detection unit 13 detects, from the face detected with the face detection unit 11, a plurality of organs of the face (facial organs), such as the tails of the eyes, the inner corners of the eyes, the eyelids, the upper lip and so on. The face authentication unit 14 carries out an authentication of the face detected with the face detection unit 11, using dictionary data (a dictionary) prepared in advance. It should be noted that the dictionary data is stored in advance on a storage unit (not shown in the drawings), for example.

The line-of-sight detection unit 15 detects the line-of-sight orientation ($\theta 1$, $\theta 2$) from the face detected with the face detection unit 11. The line-of-sight correction unit 16 corrects the line-of-sight orientation detected with the line-of-sight detection unit 15. The registration unit 17 determines whether the line-of-sight orientation corrected by the line-of-sight correction unit 16 is to be registered or not, and registers the line of sight orientation in the dictionary data in accordance with the result of this determination.

The foregoing is an explanation of an example of the configuration of the information processing apparatus 30. It should be noted that this information processing apparatus 30 may incorporate a computer. This computer includes a main control unit, such as a CPU, and a storage unit, such as a ROM (Read Only Memory), a RAM (Random Access Memory), a HDD (Hard Disk Drive) and the like. Moreover, the computer may also include an input/output unit such as buttons and a display or a touch panel or the like, and a communication unit, such as a network card or the like. These structural elements may be connected by a bus or the like, and may be controlled by executing a program that is stored in the storage unit with the main control unit.

Figure 2:
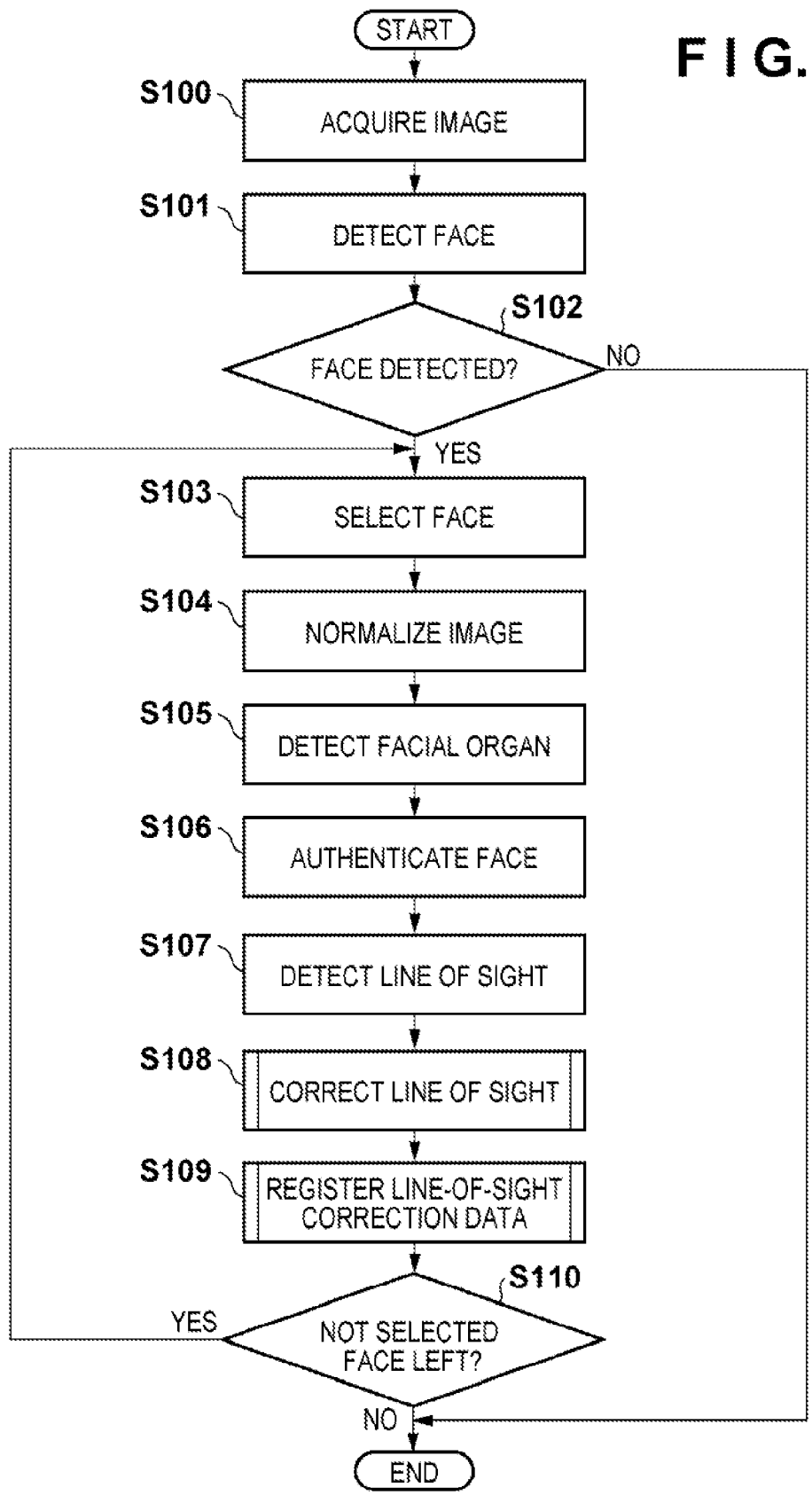
FIG. 2 is a flowchart showing an example of the processing flow of the information processing apparatus 30 shown in FIG. 1.

Referring to FIG. 2, the following is an explanation of an example of the processing flow of the information processing apparatus 30 shown in FIG. 1.

[S100, S101]

The information processing apparatus 30 acquires an image with the image acquisition unit 10 (S100). Then, the face detection unit 11 performs a face detection process on the image acquired by the processing in S100 (S101). As shown in FIG. 3, in this face detection, also the center positions 41 and 42 of the eyes and the center position 44 of the mouth are detected in addition to the center position 43 of the face.

[S102, S103]

Here, the information processing apparatus 30 determines whether a face has been detected. If the result of this determination is that no face has been detected (NO in S102), then the information processing apparatus 30 terminates the procedure. If a face has been detected (YES in S102), then the face detection unit 11 of the information processing apparatus 30 selects one face out of the one or plurality of faces detected by the processing in S102 (S103). For the technique for detecting faces, a technique such as P. Viola, M. Jones, "Rapid Object Detection using a Boosted Cascade of Simple Features", in Proc. Of CVPR, vol. 1, pp. 511-518, December, 2001 (referred to as Document 7, below), which is based on boosting, or Yusuke Mitarai, Katsuhiko Mori, Masakazu Matsugu, "Robust Face Detection System Based on Convolutional Neural Networks Using Selective Activation of Modules", FIT (Forum on Information Technology), L1-013, 2003 (referred to as Document 8 below), which is based on a neural network, may be used. The scheme for the face detection is not limited to this, and as long as it can detect the faces of persons, any face detection scheme may be used. It should be noted that in these face detection schemes, generally, the positions of the eyes and mouth and so on making up the face are detected, and from their positional relation, it is determined whether there is a face. For this reason, the center positions 41 and 42 of the eyes and the center position 44 of the mouth are detected in the face detection process in addition to the center position 43 of the face, as shown in FIG. 3.

[S104]

Using the center position 43 of the face and the center positions 41 and 42 of the eyes shown in FIG. 3, the normalized image generation unit 12 of the information processing apparatus 30 cuts out the facial region and carries out an affine transformation so that the size of the face is turned into a predetermined size and the orientation of the face is formed into an erect orientation (S104). For example, as shown in FIG. 3, the size of the face is defined as the distance L between the center position 41 of the left eye and the center position 42 of the right eye, and the orientation of the face is defined as the tilt that is calculated from the two points given by the center position 41 of the left eye and the center position 42 of the right eye. Then, an affine transformation is carried out such that tilt between the line segment L' between the center position 41 of the left eye and the center position 42 of the right eye and the line segment that is calculated from the two points given by the actual center position 41 of the left eye and the center position 42 of the right eye becomes 0°.

[S105]

Figure 4A:
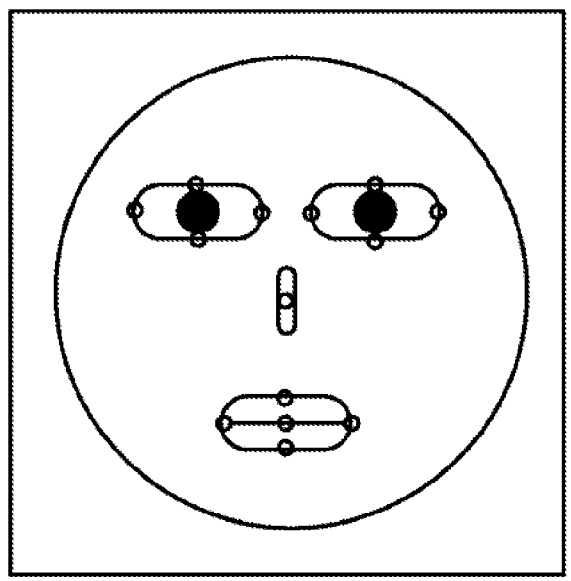
FIGS. 4A and 4B are diagrams illustrating an example of the line-of-sight detection process.

The facial organ detection unit 13 of the information processing apparatus 30 detects even finer feature points (such as the tails of the eyes, the inner corners of the eyes, the eyelids, the upper lip and so on), as shown in FIG. 4A, in addition to the center position 43 of the face, the center positions 41 and 42 of the eyes and the center position 44 of the mouth, which have been detected by the processing in S101 (S105). Various techniques may be used to detect the finer feature points (that is, the facial organs), such as the tails of the eyes, the inner corners of the eyes, the eyelids, the upper lip and so on, for example Timothy F. Cootes, Gareth J. Edwards, and Christopher J. Taylor, "Active Appearance Models", IEEE Transactions on Pattern Analysis and Machine Intelligence, Vol. 23, No. 6, JUNE 2001 (referred to below as Document 9), which may be model-based, may be used.

[S106]

The face authentication unit 14 of the information processing apparatus 30 performs a face authentication (S106) using the center position 43 of the face, the center positions 41 and 42 of the eyes and the center position 44 of the mouth, which have been detected by the processing in S101, and the finer feature points (the tails of the eyes, the inner corners of the eyes, the eyelids, the upper lip and so on) detected by the processing in S105. Examples of techniques for face authentication are methods using the entire facial region referred to as eigenfaces, as in M. Turk and A. P. Pentland, "Face Recognition Using Eigenfaces", IEEE Conf. CVPR, 1991 (referred to below as Document 10), and methods comparing local features at a plurality of sampling points, as in Japanese Patent Laid-Open No. 2004-118731 (referred to below as Document 5).

Here, to carry out the face authentication process, it is necessary to register in advance the necessary dictionary data (dictionary) in order to identify individuals. The present embodiment is explained for the case that data including the facial images themselves is used as the dictionary data. Needless to say, the dictionary data (information relating to faces) is not limited thereto, and may also be configured with data including characteristic amounts that have been extracted by such processing as filtering, for example. As will be explained in more detail further below, the dictionary data used for the face authentication includes data for correcting the line-of-sight orientation, in addition to facial images (see FIG. 6A).

Figure 4B:
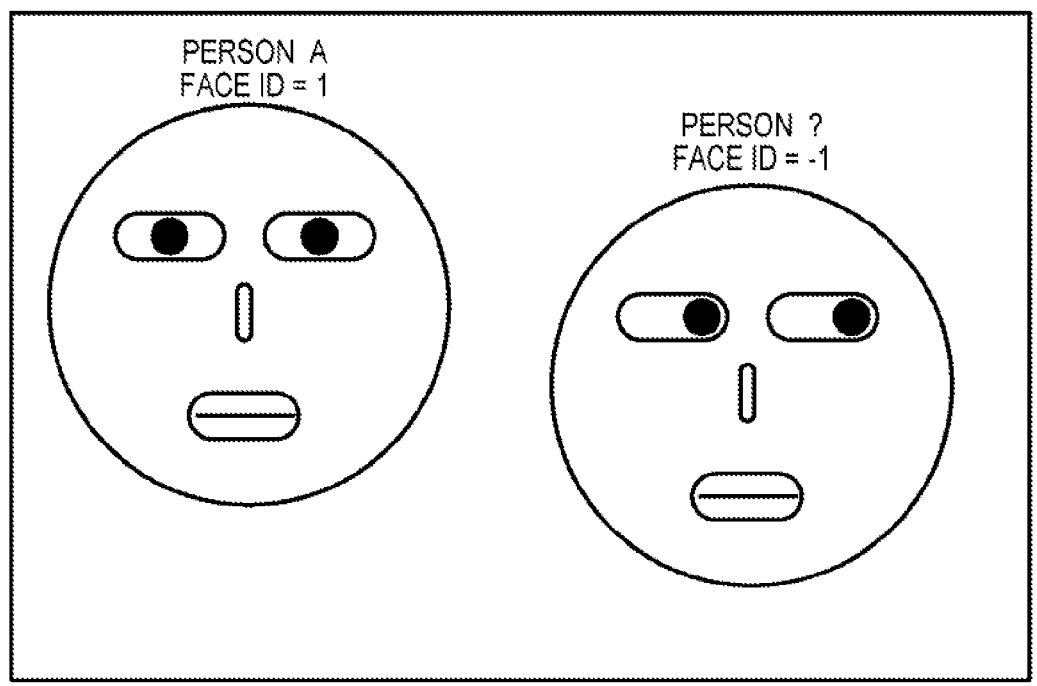

As shown in FIG. 4B, in the present embodiment, a unique face ID corresponding to a registered face is output from the face authentication unit 14 as the result of the face authentication. For example, if the face is registered, a positive ID may be output and if the face is not registered, a negative ID may be output. Also this face ID is included in the dictionary data together with the data for correcting the line-of-sight orientation (see FIG. 6A).

[S107]

The line-of-sight detection unit 15 of the information processing apparatus 30 extracts, as line-of-sight data, the center position 43 of the face, the center positions 41 and 42 of the eyes and the center position 44 of the mouth, which have been detected by the processing in S101, and the finer feature points (the tails of the eyes, the inner corners of the eyes, the eyelids, the upper lip and so on) detected by the processing in S105. Then, using this line-of-sight data, it detects not only the line-of-sight orientation ($\theta 1$, $\theta 2$), but also the orientation ($\alpha 1$, $\alpha 2$) of the face and the orientation ($\beta 1$, $\alpha 2$) of the eyes (S107).

As a technique for detecting the line of sight, it is possible to use the relative positions of the finer feature points (the tails of the eyes, the inner corners of the eyes, the eyelids, the upper lip and so on) detected by the processing in S105, as disclosed in Japanese Patent Laid-Open No. 2007-265367 (referred to below as Document 6), for example. Moreover, as disclosed in Document 2 for example, it is also possible to detect the line-of-sight orientation ($\theta 1$, $\theta 2$) by setting a plurality of regions of the finer feature points (the tails of the eyes, the inner corners of the eyes, the eyelids, the upper lip and so on) detected by the processing in S105 as a reference and comparing with a dictionary image prepared in advance. Note that in Document 6, position and distance information is obtained as the line-of-sight data, and in Document 2, brightness and characteristic amounts extracted by filter processing are obtained as the line-of-sight data.

Here, in the present embodiment, the positional information of the finer feature points (the tails of the eyes, the inner corners of the eyes, the eyelids, the upper lip and so on) detected by the processing in S105 is obtained as the line-of-sight data as disclosed in Document 6, and the line-of-sight orientation ($\theta 1$, $\theta 2$) etc. is detected using this line-of-sight data. Needless to say, there is no limitation to this approach to detect the line-of-sight orientation ($\theta 1$, $\theta 2$) etc., and it is also possible to use another approach.

Figure 13A:
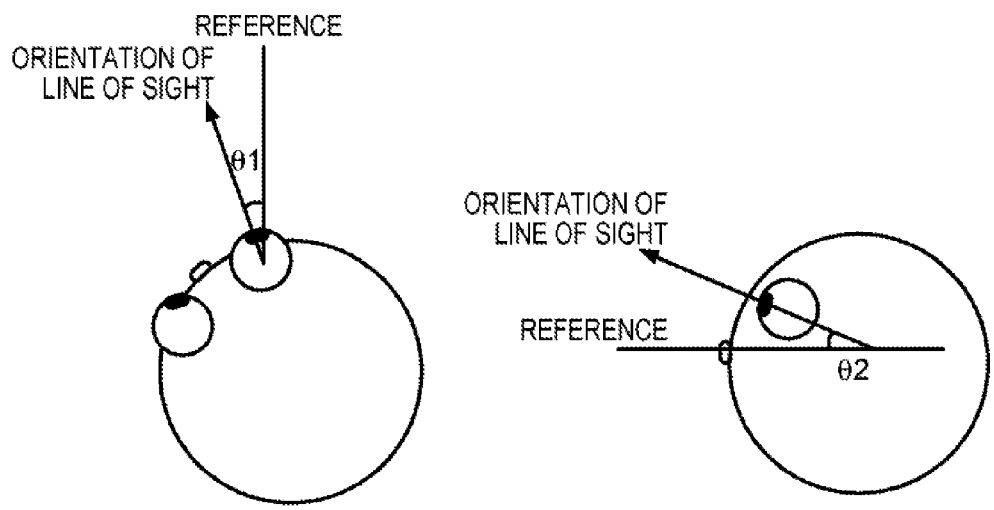
FIGS. 13A and 13B are diagrams illustrating a conventional technique.
Figure 13B:
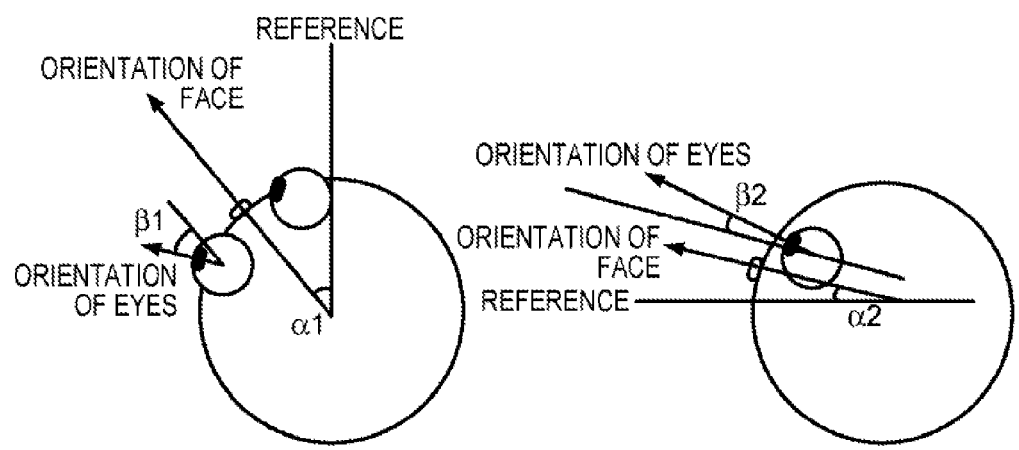
Figure 14A:
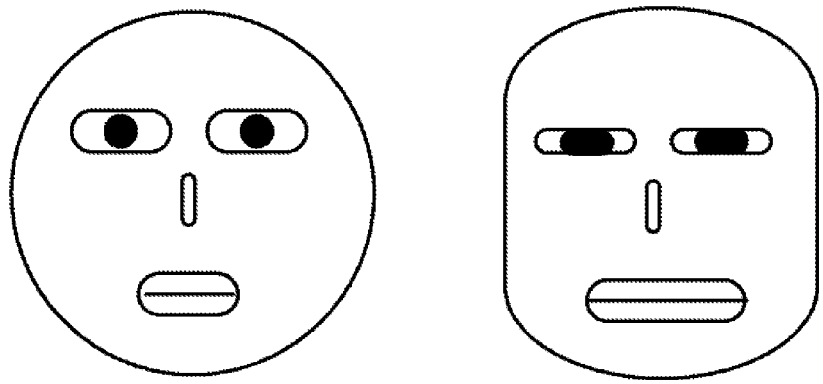
FIGS. 14A and 14B are diagrams illustrating a conventional technique.
Figure 14B:
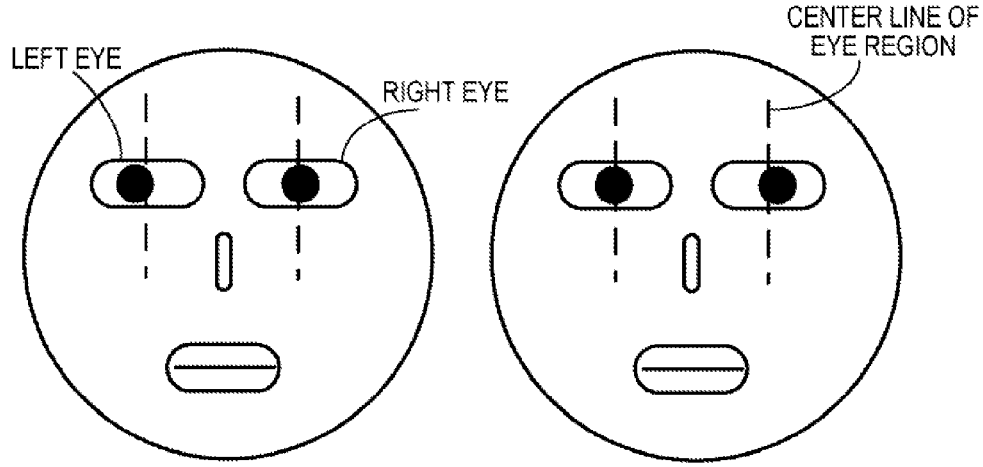

It should be noted that the reference direction illustrated in FIGS. 13A and 13B may be set in a variety of target objects, for example an image capturing apparatus such as a camera, or a marker. In the present embodiment, the line-of-sight orientation of the reference direction is defined as $\theta 1 = \theta 2 = 0$.

That is to say, if θ1=θ2=0, then the line of sight of the object to be taken is directed at the target object.

Moreover, it is also possible not to detect the line-of-sight orientation with respect to a predetermined target object from a reference direction (that is, an angle representing the line-of-sight orientation), but to detect other information as the information relating to the line of sight. For example, it is also possible to detect the likelihood of a predetermined line-of-sight direction as the extent to which the line of sight to target object is in a predetermined direction (that is, the likelihood indicating that the line-of-sight direction matches a predetermined direction).

Thus, the face detection process in S101, the normalized image generation process in S104, the facial organ detection process in S105, the face authentication process in S106 and the line-of-sight detection process in S107 are carried out in that order. It should be noted that the face detection process, the normalized image generation process, the facial organ detection process, the face authentication process, and the line-of-sight detection process do not necessarily have to use the above-noted techniques and approaches and may also be carried out using other techniques.

Here, the line-of-sight detection process in S107, that is, the process of calculating the orientation (α1, α2) of the face and the orientation (β1, β2) of the eyes is carried out using information on the relative positions of the averaged features (the tails of the eyes, the inner corners of the eyes, the eyelids, the upper lip and so on) from a large amount of facial images that has been obtained in advance. More specifically, the orientation of the face and the orientation of the eyes are calculated using these averaged relative positions and the relative positions of the organs detected by the processing in S105. Therefore, there is the possibility that individual shifts (shift amounts) occur in the orientation (α1, α2) of the face and the orientation (β1, β2) of the eyes calculated by this processing.

To address this, this shift amount is corrected in the present embodiment by carrying out a line-of-sight correction process. Thus, the orientation (α1, α2) of the face and the orientation (β1, β2) of the eyes are calculated with higher precision, regardless of differences among individuals.

[S108]

The line-of-sight correction unit 16 of the information processing apparatus 30 carries out the line-of-sight correction process (S108). This process is explained in detail further below, but explaining it in simple terms, it corrects the line-of-sight orientation detected by the processing in S107 based on the face authentication result of S106. If, as a result of this processing, a correction is necessary, then the line-of-sight correction unit 16 outputs the corrected line-of-sight orientation (θ1', θ2'), and if no correction is necessary, the line-of-sight correction unit 16 outputs the (unchanged) line-of-sight orientation (θ1, θ2).

[S109, S110]

After this, the information processing apparatus 30 determines whether the line-of-sight correction data correcting the line-of-sight orientation (calculated by the processing in S108) is registered in the dictionary data by the registration unit 17, and carries out the registration of the line-of-sight correction data based on the result of this determination (S109). It should be noted that the details of this process are explained further below. After this, if there is a face among the faces detected by the processing in S101 for which the above-described processing in S103 to S109 has not yet been carried out (YES in S110), then the information processing apparatus 30 returns to the processing in S103. And if the above-described processing has been carried out for all faces detected by the processing in S101 (NO in S110), then the information processing apparatus 30 terminates the procedure.

Figure 5:
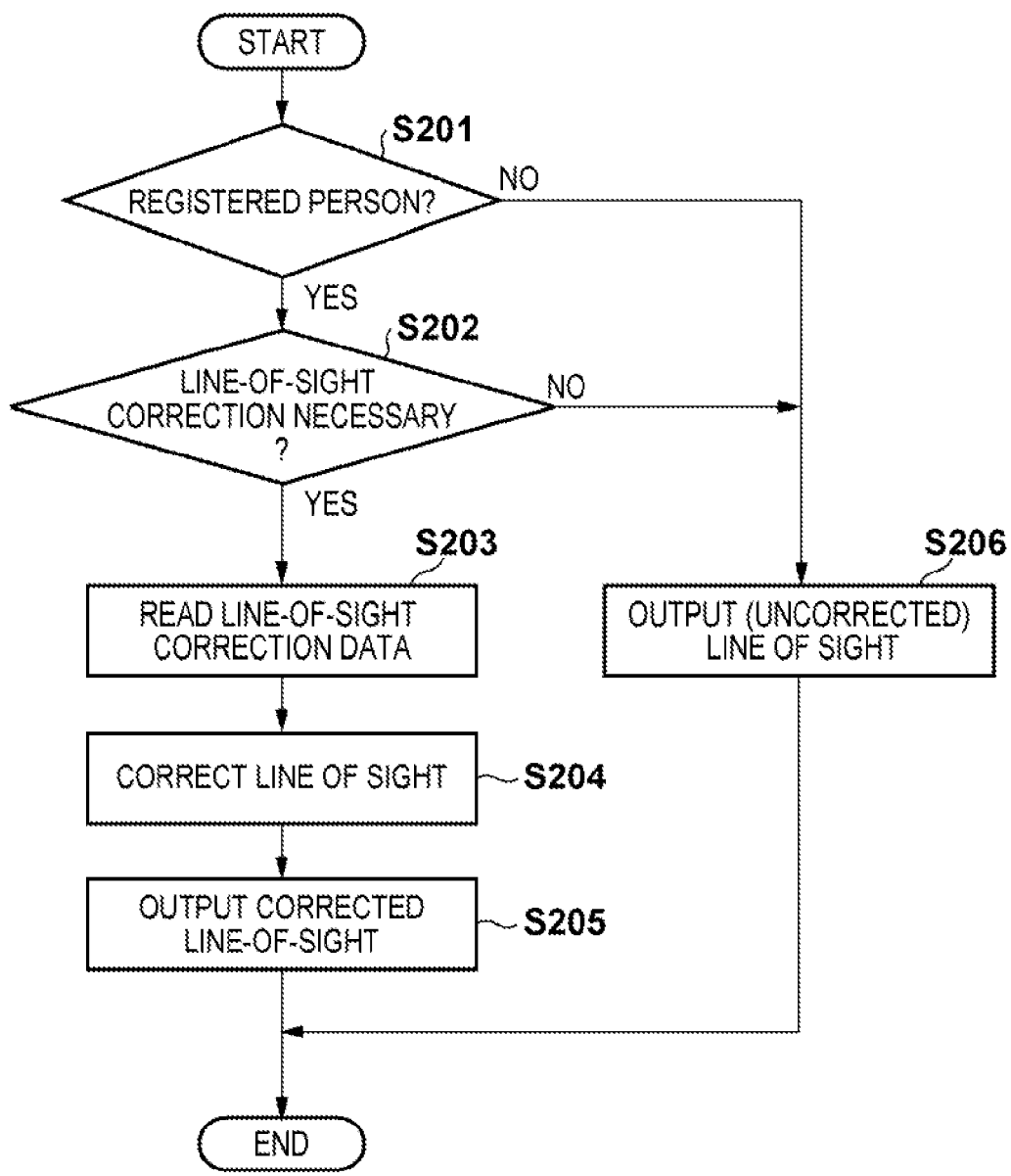
FIG. 5 is a flowchart showing an example of the processing flow of the line-of-sight correction process shown in S108 of FIG. 2.

Next, an example of the processing flow of the line-of-sight correction process in S108 of FIG. 2 described above is explained in detail, with reference to FIG. 5.

[S201, S202, S206]

When this process starts, the line-of-sight correction unit 16 of the information processing apparatus 30 first determines, based on the face authentication result (face ID) of S106, whether the face to be processed is already registered in the dictionary data. That is to say, if a positive ID is obtained as the face authentication result in S106, then it is determined that the face is already registered, and if a negative ID is obtained, then it is determined that the face is not yet registered.

If the result of this determination is that it is a not registered face (with negative ID) (NO in S201), then the person cannot be identified, so that after the line-of-sight correction unit 16 of the information processing apparatus 30 outputs the (uncorrected) line-of-sight orientation (θ1, θ2) (S206), the procedure is terminated.

On the other hand, if the face is already registered (with positive ID) (YES in S201), then the line-of-sight correction unit 16 of the information processing apparatus 30 determines whether a line-of-sight correction is necessary. For this processing, the dictionary data (dictionary) shown in FIG. 6A is used. In this dictionary data, the face ID, a line-of-sight correction flag indicating whether correction of the line of sight is necessary or not, the line-of-sight correction orientation used for the line-of-sight correction, and the facial image used for the face authentication in S106 are registered in association with each other. In this case, it is indicated for face ID=1 that a line-of-sight correction is necessary, and it is indicated for face ID=2 that a line-of-sight correction is not necessary, for example. It should be noted that a method for preparing dictionary data is explained further below.

[S203, S206]

Here, if a line-of-sight correction is not necessary, that is, if the line-of-sight correction flag is 0 (NO in S202), then the line-of-sight correction unit 16 of the information processing apparatus 30 outputs the (uncorrected) line-of-sight orientation (θ1, θ2) (S206), and the procedure is terminated.

On the other hand, if a line-of-sight correction is necessary, that is, if the line-of-sight correction flag is 1 (YES in S202), then the information processing apparatus 30 reads the line-of-sight correction data (a, b) from the dictionary data (see FIG. 6A), based on the face authentication result (face ID) of S106 (S203).

[S204, S205]

Using the line-of-sight orientation (θ1, θ2) detected by the processing in S107 and the line-of-sight correction data (a, b), the information processing apparatus 30 corrects the line-of-sight orientation in accordance with the following equations (S204). Then, it outputs the corrected line-of-sight orientation (θ1', θ2') (S205).

$$\theta1'=\theta1+a$$

$$\theta2'=\theta2+b$$

Next, an example of the processing flow of the line-of-sight correction data registration process shown in S109 in FIG. 2 mentioned above is explained in detail with reference to FIG. 7. It should be noted that the present embodiment is explained for the case that a line-of-sight correction data registration mode or the like is provided, and the line-of-sight correction data is registered only if this mode is selected. However, it is also possible to determine whether the processing for registering the line-of-sight correction data is to be carried out using other means than this mode.

[S301]

The registration unit 17 of the information processing apparatus 30 first determines whether the apparatus is in the line-of-sight correction data registration mode. If the apparatus is not in the line-of-sight correction data registration mode (NO in S301) then the information processing apparatus 30 terminates the procedure directly.

[S302]

If the apparatus is in the line-of-sight correction data registration mode (YES in S301), then the registration unit 17 of the information processing apparatus 30 carries out the same processing as in S201 in FIG. 5 described above, and determines whether the face is already registered in the dictionary data.

[S303]

If the result of this determination is that the face is not registered (NO in S302), then the registration unit 17 of the information processing apparatus 30 registers in the dictionary data the facial image for use in the face authentication process in S106 of FIG. 2 (S303). Here, a new face ID=3 is assigned to the facial image 51, and the facial image 51 is registered in the dictionary data, as shown in FIG. 6B for example.

[S304]

The registration unit 17 of the information processing apparatus 30 determines whether the face requires line-of-sight correction. In the present embodiment, as noted above, the line-of-sight orientations ($\theta1$, $\theta2$) with respect to the reference direction (the direction where the object is present) indicated in FIGS. 13A and 13B are respectively defined as 0°. Moreover, it is assumed that the line-of-sight orientation ($\theta1$, $\theta2$) of the facial image in case that the line-of-sight correction data registration mode is selected is directed in the reference direction, that is, the direction of the target object.

Under these conditions, in the case of faces where there are no individual differences, the line-of-sight orientation ($\theta1$, $\theta2$) that is output by the line-of-sight detection in S107 will be approximately zero. By contrast, in the case of faces where there are individual differences, the line-of-sight orientation ($\theta1$, $\theta2$) that is output by the line-of-sight detection in S107 will have a value different from zero, and the line-of-sight orientation ($\theta1$, $\theta2$) that is output from the line-of-sight detection in S107 will be the line-of-sight correction data (a, b).

Therefore, if each of the line-of-sight orientations ($\theta1$, $\theta2$) that are output from the line-of-sight detection unit 15 satisfies the condition $\theta_{Th1} \leq \theta1 \leq \theta_{Th2}$, $\theta_{Th3} \leq \theta2 \leq \theta_{Th4}$ (where $\theta_{Th1}$, $\theta_{Th2}$, $\theta_{Th3}$, and $\theta_{Th4}$ are thresholds), then the registration unit 17 determines that a line-of-sight correction is not necessary. In all other cases, it is determined that a line-of-sight correction is necessary.

[S305, S306, S308]

Here, if it is determined that line-of-sight correction is not necessary (NO in S304), then the registration unit 17 of the information processing apparatus 30 sets the line-of-sight correction flag to (S308), and then the procedure is terminated. On the other hand, if it is determined that line-of-sight correction is necessary (YES in S304), then the registration unit 17 of the information processing apparatus 30 sets the line-of-sight correction flag to (S305). Then, the line-of-sight orientation ($\theta1$, $\theta2$) output by the processing in S107 is registered as the line-of-sight correction data (a, b) in the dictionary data (S306), and then the procedure is terminated. It should be noted that the line-of-sight correction data may also be registered in the dictionary data if various other conditions are satisfied, and the details of these conditions will be explained for the update process in S309.

[S307, S308, S309]

If it is determined by the processing in S302 that the face has already been registered (YES in S302), then, using the line-of-sight orientation ($\theta1$, $\theta2$) that is output by the processing in S107, the registration unit 17 of the information processing apparatus 30 determines whether the face requires line-of-sight correction. This determination process may be carried out with the same approach as the processing in S304. It should be noted that in this case, the line-of-sight correction data has been registered already (previously).

If the result of the determination is that line-of-sight correction is not necessary (NO in S307), then the registration unit 17 of the information processing apparatus 30 sets the line-of-sight correction flag to zero (S308), and then terminates the procedure.

On the other hand, if it is determined that line-of-sight correction is necessary (YES in S307), then the registration unit 17 of the information processing apparatus 30 determines whether a predetermined condition is satisfied. Then, if the predetermined condition is satisfied, the line-of-sight orientation ($\theta1$, $\theta2$) output by the processing in S107 is updated in the dictionary data as line-of-sight correction data (a, b) (S309).

The following is an explanation of several examples of the predetermined condition that is used to determine whether the line-of-sight correction data (a, b) is to be registered (or updated) in the dictionary data. This predetermined condition serves as a criterion to determine whether the registration (or update) in S306 and S309 is to be carried out, as noted above.

1. First Registration Method

If the line-of-sight correction data (a, b) already registered in the dictionary data and the line-of-sight orientation ($\theta1$, $\theta2$) have different values, then the line-of-sight orientation ($\theta1$, $\theta2$) that is output by the line-of-sight detection in S107 is registered as the line-of-sight correction data (a, b).

2. Second Registration Method

Like the first registration method, the second registration method is a registration method for the case that the line-of-sight correction data (a, b) already registered in the dictionary data and the line-of-sight orientation ($\theta1$, $\theta2$) have different values. Here, in the second registration method, weighted average values of the line-of-sight orientation ($\theta1$, $\theta2$) output by the line-of-sight detection in S107 and the line-of-sight correction data (a, b) already registered in the dictionary data are registered as the line-of-sight correction data (a, b).

3. Third Registration Method

As shown in FIG. 8A, the orientation ($\alpha1'$, $\alpha2'$) of the face during the registration is added as information registered in the dictionary data. Then, if the orientation ($\alpha1'$, $\alpha2'$) of the face satisfies a predetermined condition, the line-of-sight orientation ($\theta1$, $\theta2$) is registered as the new line-of-sight correction data (a, b). For example, if the orientation ($\alpha1$, $\alpha2$) of the face selected by the processing in S103 is closer to the reference direction than the orientation ($\alpha1'$, $\alpha2'$) of the face already registered in the dictionary data, then this line-of-sight orientation ($\theta1$, $\theta2$) of the face is registered as the new line-of-sight correction data (a, b).

4. Fourth Registration Method

As shown in FIG. 8A, the size L' of the face (see FIG. 3) is added as the information registered in the dictionary data. Then, if the size L' of the face satisfies a predetermined condition, the line-of-sight orientation ($\theta1$, $\theta2$) is registered as the new line-of-sight correction data (a, b). For example, if the size L of the face (see FIG. 3) is at least 30 [pixel], then the line-of-sight orientation ($\theta1$, $\theta2$) is registered in the dictionary data as the new line-of-sight correction data (a, b). Also, if the face width L of the face selected by the processing in S103 is larger than the face width L' that is already registered in the dictionary data, then the line-of-sight orientation (θ1, θ2) may be registered as the new line-of-sight correction data (a, b).

5. Fifth Registration Method

As shown in FIG. 8B, it is also possible to group the dictionary data into a plurality of groups with ranges of the orientation (α1, α2) of the face, and to hold line-of-sight correction data (a, b) for the respective groups. For example, the line-of-sight correction data a1 is used within a range in which the orientation α1 of the face is −10≤α1≤10, the line-of-sight correction data α2 is used within a range in which the orientational of the face is α1≥10, and the line-of-sight correction data a3 is used within a range in which the orientation α1 of the face is α1≤−10.

6. Sixth Registration Method

In the sixth registration method, the history of the line-of-sight orientation (θ1, θ2) of the same person is looked up in accordance with the face authentication result in S106. Then, as shown in FIG. 8C, the line-of-sight orientation (θ1, θ2) in the steady (stabilized) state, in which the line-of-sight orientation becomes a constant value, is registered in the dictionary data as the line-of-sight correction data (a, b). It should be noted that there is no limitation to the line-of-sight orientation, and it is also possible to register in the dictionary data the line-of-sight orientation (θ1, θ2) when the facial expression, the size of the face or the orientation of the face has assumed a steady (stabilized) state as the new line-of-sight correction data (a, b).

7. Seventh Registration Method

It is also possible to register or update the dictionary data in the case that a condition is satisfied that is obtained by combining any of the above-described first to sixth registration methods.

With the present embodiment as described above, shifts (shift amounts) that are caused by individual differences in the line-of-sight orientation (θ1, θ2) obtained as a result of the line-of-sight detection in S107 are corrected using line-of-sight correction data (a, b) that is stored individually.

Thus, the problems during the detection of the line-of-sight orientation that were caused by shifts in the line-of-sight orientation (θ1, θ2) occurring due to the size of the facial organs or the positional relationship of the facial organs, or due to the dominant eye can be solved. Therefore, it is possible to detect the line-of-sight orientation (θ1, θ2) with high precision, without suffering the influence of individual differences.

Embodiment 2

The following is an explanation of Embodiment 2. In this Embodiment 2, a case is explained in which the information processing apparatus 30 described in Embodiment 1 is applied to an image capturing apparatus, such as a digital camera or the like, and an automatic shutter function is realized using this applied functionality.

In Embodiment 2, the reference direction shown in FIGS. 13A and 13B is defined as a camera direction, and it is determined whether the line-of-sight direction of the object is the camera direction. In the following explanations, the object's line-of-sight direction facing the camera is referred to as "camera line of sight", and detecting the camera line of sight is referred to as "camera line-of-sight detection."

Figure 9:
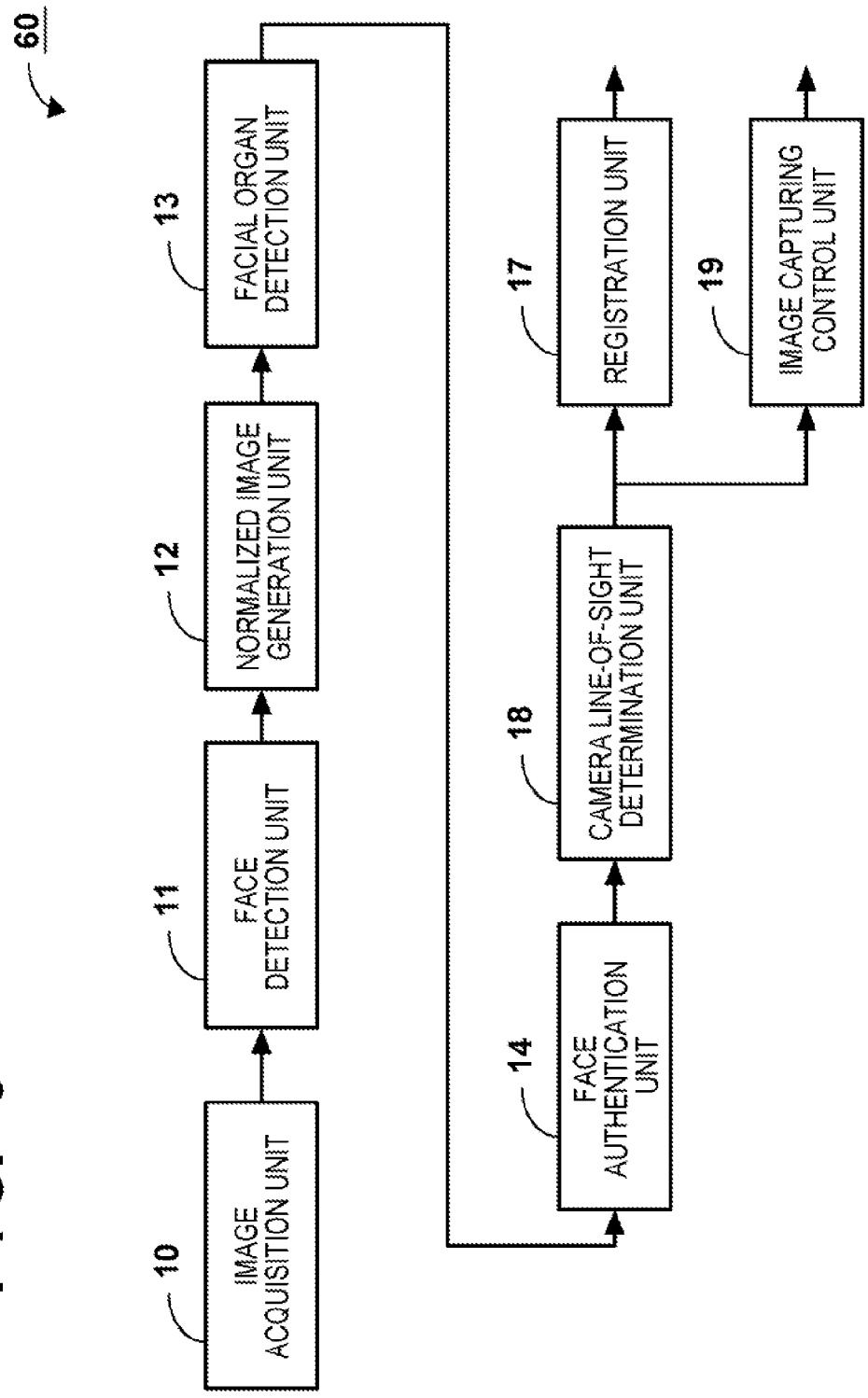
FIG. 9 is a diagram showing an example of the functional configuration of an image capturing apparatus 60 according to Embodiment 2.

FIG. 9 is a diagram showing an example of the functional configuration of an image capturing apparatus 60 according to Embodiment 2.

As its functional configuration, the image capturing apparatus 60 is configured including an image acquisition unit 10, a face detection unit 11, a normalized image generation unit 12, a facial organ detection unit 13, a face authentication unit 14, a camera line-of-sight determination unit 18, a registration unit 17, and an image capturing control unit 19.

Here, the camera line-of-sight determination unit 18 determines whether the face to be processed (more specifically, the line-of-sight orientation) faces in the camera direction. The image capturing control unit 19 controls the image capturing based on the determination result of the camera line-of-sight determination unit 18. If all lines of sight of the faces of the persons detected in the image are camera lines of sight, then the image capturing control unit 19 performs the image capturing, for example. It should be noted that elements other than the camera line-of-sight determination unit 18 and the image capturing control unit 19 fulfill the same functionality as in the configuration of FIG. 1 explained in Embodiment 1, so that further explanations thereof have been omitted.

Figure 10:
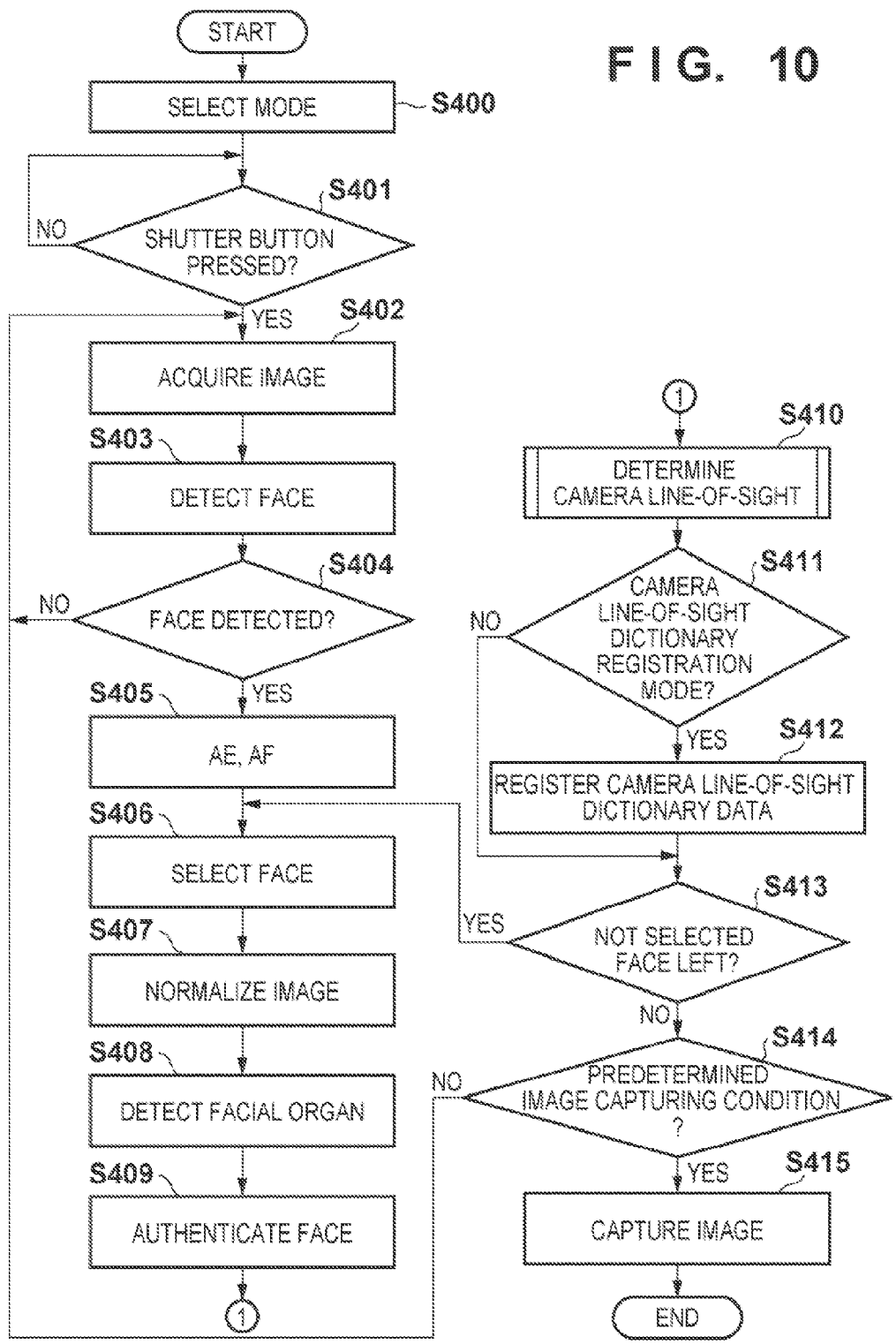
FIG. 10 is a flowchart showing an example of the processing flow of the image capturing apparatus 60 according to Embodiment 2.

Referring to FIG. 10, the following is an explanation of an example of the processing flow carried out by the image capturing apparatus 60 according to Embodiment 2.

[S400]

In this process, first, a mode selection is carried out by the user. More specifically, there are two modes, namely a camera line-of-sight dictionary registration mode, in which a camera line-of-sight dictionary is registered by the processing in S411 explained below, and an automatic image capturing mode, in which image capturing is carried out automatically if predetermined image capturing conditions are satisfied. Here, it is assumed that the automatic image capturing mode is selected. It should be noted that in this automatic image capturing mode, image capturing is carried out automatically if the line of sight of a person faces in the camera direction.

[S401, S402]

The procedure is executed if the shutter button is pressed down in the mode (automatic image capturing mode) selected by the processing in S400. Accordingly, the image capturing apparatus 60 determines whether the shutter button is pressed. If the shutter button is pressed (YES in S401) then the image acquisition unit 10 of the image capturing apparatus 60 acquires an image through an optical system such as a lens, an image capturing element such as a CMOS or a CCD, and an AD converter (S402).

[S403]

The face detection unit 11 of the image capturing apparatus 60 subjects the image acquired by the processing in S402 to a face detection process. Then, it is determined whether a face has been detected, and if no face has been detected (NO in S404), the procedure returns to the processing of S402.

[S404 to S409]

If the result of the processing in S403 is that a face has been detected (YES in S404), then the image capturing apparatus 60 performs AE (Auto Exposure) and AF (Auto Focus) (S405). After this, the processing from the face selection process to the face authentication process is carried out (S406 to S409), as in Embodiment 1. That is to say, one of the one or more detected faces is selected, that face is subjected to an image normalization process, and facial organ detection is performed on the normalized image. After this, a face authentication is performed.

[S410]

The camera line-of-sight determination unit 18 of the image capturing apparatus 60 performs a camera line-of-sight determination process (S410). This process is explained in detail further below, but explaining it in simple terms, it determines whether the line of sight of the face selected by the processing in S406 faces in the camera direction.

[S411, S412]

If the camera line-of-sight dictionary registration mode has been selected by the processing in S400 (YES in S411), then the registration unit 17 of the image capturing apparatus 60 performs a registration of the camera line-of-sight dictionary (S412). The details are given further below, but in Embodiment 2, a dictionary image relating to the orientation (α1, α2) of the face and a dictionary image relating to the eye orientation (β1, β2) are registered for each person, based on the result of the face authentication in S409 (the face ID). It should be noted that it is also possible to register a plurality of sets of camera line-of-sight dictionary data for each person's face.

[S413]

If the faces detected by the processing in S403 include a face for which the above-described processing of S406 to S412 has not yet been carried out (YES in S413), then the image capturing apparatus 60 returns to the processing of S406. If the above-described processing has been carried out for all faces detected by the processing in S403 (NO in S413), then the image capturing apparatus 60 advances to the processing in S414.

[S414]

The image capturing control unit 19 of the image capturing apparatus 60 determines whether a predetermined image capturing condition is satisfied or not. In this determination processing, it is determined whether the lines of sight of all faces detected in the processing in S403 are camera lines of sight, for example. Note that the image capturing condition can be set or updated when selecting the mode in S400.

If as the result of this determination it is determined that the predetermined image capturing condition is satisfied (YES in S414), then the image capturing control unit 19 of the image capturing apparatus 60 carries out image capturing by controlling an image capturing unit (not shown in the drawings) (S415). This image capturing is carried out in the case that the line of sight of all faces detected by the processing in S403 is the camera line of sight, for example. It should be noted that prior to image capturing, it is also possible to carry out AE and AF again.

On the other hand, if it is determined by the processing in S414 that the predetermined image capturing condition is not satisfied (NO in S414), then the image capturing apparatus 60 returns to the processing of S402, and the next image is acquired.

Figure 11:
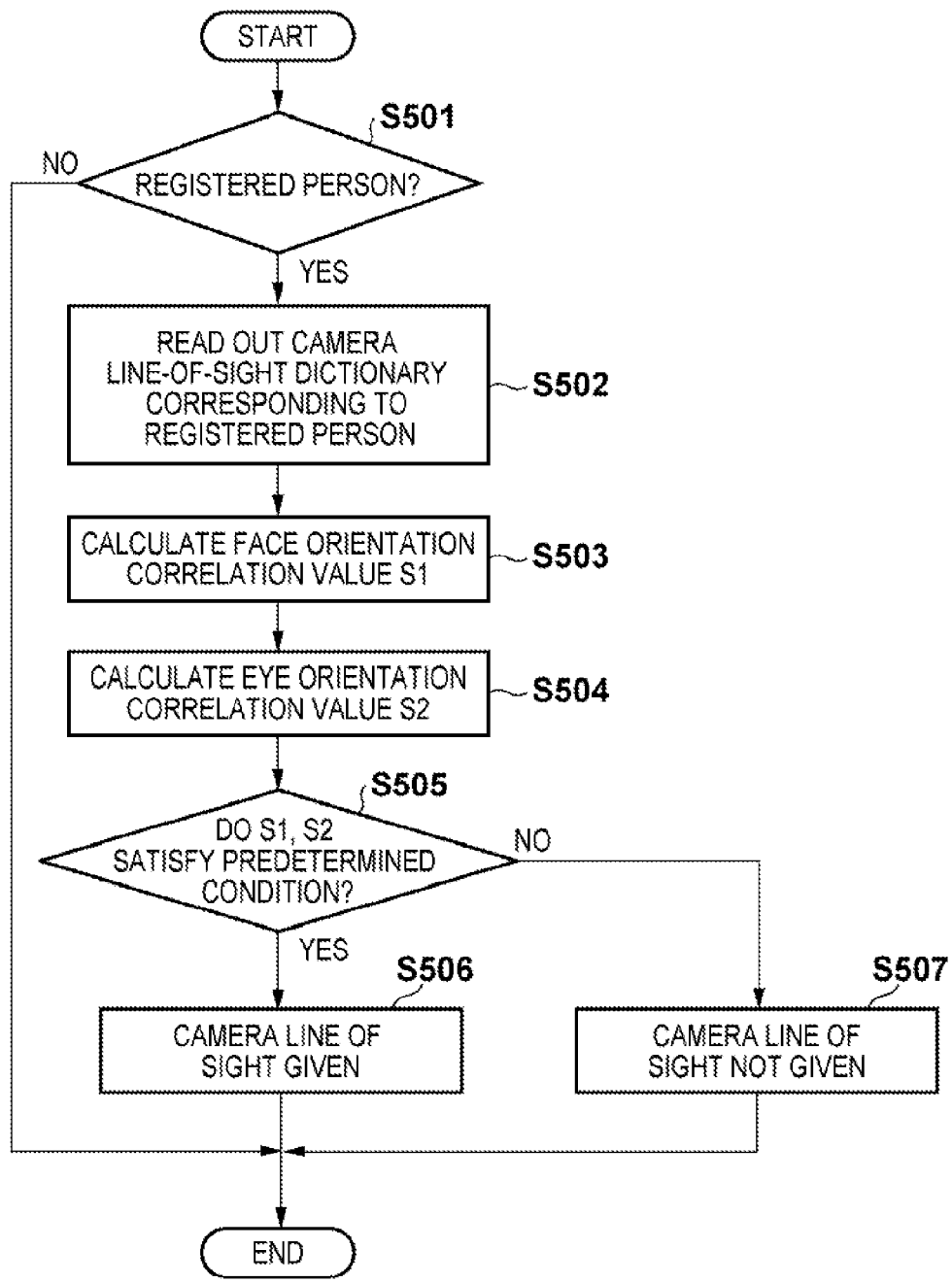
FIG. 11 is a flowchart showing an example of the processing flow of the camera line-of-sight detection process shown in S410 of FIG. 10.

Next, an example of the processing flow of the camera line-of-sight detection process shown in S410 in FIG. 10 described above is explained in detail with reference to FIG. 11.

[S501]

Based on the face authentication result in S409 (the face ID), the camera line-of-sight determination unit 18 of the image capturing apparatus 60 determines whether the face selected by the processing in S406 is already registered or not. If the result of this determination is that the face is not registered (NO in S501), then the image capturing apparatus 60 terminates this process.

[S502]

On the other hand, if the face is already registered (YES in S501), then the camera line-of-sight determination unit 18 of the image capturing apparatus 60 reads out the camera line-of-sight dictionary data corresponding to the face authentication result of S409 (the face ID) (S502). It should be noted that in Embodiment 2, if the line of sight of a person faces in the camera direction, then automatic image capturing (automatic image capturing mode) is carried out, so that the image registered in the dictionary data becomes an image in which the person's line of sight faces the camera direction.

Figure 12:
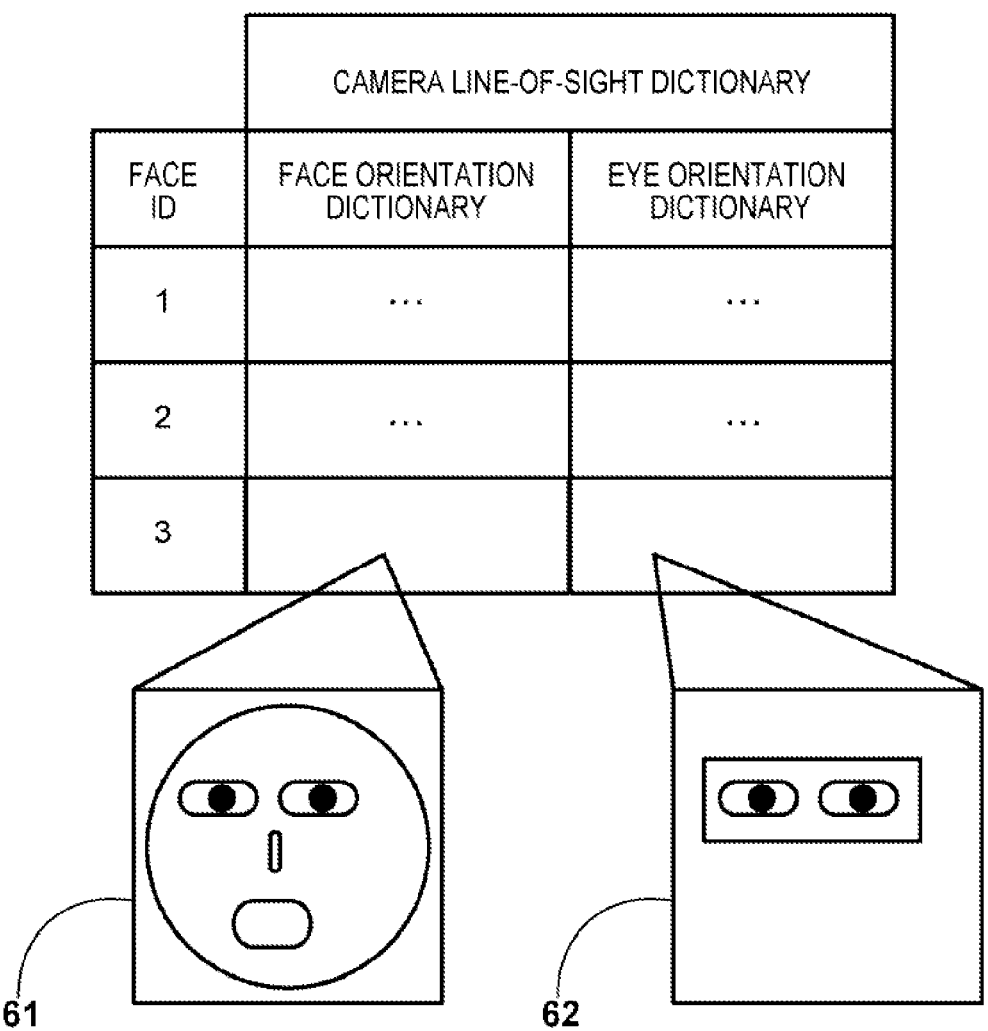
FIG. 12 is a diagram showing an example of the camera line-of-sight dictionary data according to Embodiment 2.

FIG. 12 shows an example of a camera line-of-sight dictionary image for the case that a person's line of sight faces the camera direction. The camera line-of-sight dictionary image is constituted by two dictionary images, namely a dictionary image 61 relating to the face orientation (α1, α2) and a dictionary image 62 relating to the eye orientation (β1, β2). The dictionary image 61 relating to the face orientation (α1, α2) is a normalized image that is generated by the processing in S407. The dictionary image 62 relating to the eye orientation (β1, β2) is an image of an eye region that is cut out from the normalized image based on the organ detection result of the processing in S408. In Embodiment 2, the camera line-of-sight dictionary image is provided in correspondence with each person (individual ID) in this manner.

[S503]

The camera line-of-sight determination unit 18 of the image capturing apparatus 60 sums up the differences in the image values of the face image selected by the processing in S406 and the dictionary image relating to the face orientation read out by the processing in S502. Thus, the differential of the images is determined, and the inverse of this differential is calculated as a correlation value S1 (S503). Accordingly, the larger the correlation value S1 is, the higher the correlation is that this indicates.

[S504]

The camera line-of-sight determination unit 18 of the image capturing apparatus 60 sums up the differences in the image values of the face image selected by the processing in S406 and the dictionary image relating to the eye orientation read out by the processing in S502. Thus, the differential of the images is determined, and the inverse of this differential is calculated as a correlation value S2 (S504).

It should be noted that in Embodiment 2, a brightness image is used for the camera line-of-sight data, but it is also possible to use edge image obtained by edge detection, for example, or to use data obtained by a histogram-based feature extraction, as in Chi-Ho Chan, Josef Kittler, and Kieron Messer, "Multi-scale local binary pattern histograms for face recognition", In Seong-Whan Lee and Stan Z. Li, editors, ICB, volume 4642 of Lecture Notes in Computer Science, pages 809-818. Springer, 2007, or M. Bertozzi, A. Broggi, M. Del Rose, M. Felisa, A. Rakotomamonjy and F. Suard, "A Pedestrian Detector Using Histograms of Oriented Gradients and a Support Vector Machine Classifier", IEEE Intelligent Transportation Systems Conference, 2007. Furthermore, it is also possible to employ a configuration in which there are a plurality of dictionaries registered for each person. Also the method for calculating the correlation values is not limited to that explained above, and it is possible to use a discrimination machine (support vector machine), as in V. Vapnik, "Statistical Learning Theory", John Wiley & Sons, 1998, which is trained in advance using images with and images without camera line-of-sight.

[S505]

The camera line-of-sight determination unit 18 of the image capturing apparatus 60 determines whether the correlation value S1 calculated by the processing in S503 and the correlation value S2 calculated by the processing in S504 satisfy a predetermined condition. Specifically, it determines whether the correlation value S1 is at least as large as a threshold S1th and the correlation value S2 is at least as large as a threshold S2th (S505).

[S506]

If the result of this determination is that the correlation value S1 is at least as large as the threshold S1th and the correlation value S2 is at least as large as the threshold S2th (YES in S505), then the camera line-of-sight determination unit 18 of the image capturing apparatus 60 determines that the person's line of sight is a camera line of sight (S506). Otherwise (NO in S505), the camera line-of-sight determination unit 18 of the image capturing apparatus 60 determines that the person's line of sight is not a camera line of sight (S507). After this, the image capturing apparatus 60 terminates the procedure.

With the Embodiment 2 as explained above, camera line-of-sight dictionary data is held in which images are registered, in which the line of sight corresponding to each person faces a camera direction. Moreover, by comparing the face of a person to be processed with an image (face) registered in this camera line-of-sight dictionary data, it is determined whether the person subject to processing has a camera line of sight, and image capturing is carried out based on the result of this determination. Thus, it is possible to determine a highly precise camera line of sight regardless of individual differences, and image capturing can be carried out at a better timing.

Thus, it is possible to apply the line-of-sight detection technique explained in Embodiment 1 to an automatic shutter of a digital camera as explained in Embodiment 2. Furthermore, it can also be applied to other configurations, such as a look-away detection in an automobile or for image searching, for example.

It should be noted that also in Embodiment 2, it is possible to detect the likelihood of the predetermined line-of-sight direction explained in Embodiment 1 instead of the line-of-sight-direction as the information relating to the line of sight. In this case, the likelihood that the camera direction matches the reference direction may be calculated and image capturing may be carried out in the case that this likelihood is greater than a predetermined threshold. It should be noted that the correlation values in Embodiment 2 correspond to the likelihood of the predetermined line-of-sight direction.

With the present invention as described above, shifts in the orientation of the line-of-sight that occur for various reasons are cancelled, so that the line-of-sight orientation can be detected with higher precision.

The foregoing describes examples of representative embodiments of the present invention, but the present invention is not limited to the foregoing or to the embodiments shown in the drawings, and also can be carried out by modifying it to an extent that does not depart from the essence of the invention.

For example, the present invention may be embodied as a system, apparatus, method, program or non-transitory computer-readable storage medium or the like. More specifically, it may also be applied to systems constituted by a plurality of devices, or to apparatuses made of a single device.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., non-transitory computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-095283 filed on Apr. 21, 2011, which is hereby incorporated by reference herein in its entirety.

What is claimed is:

1. An image capturing apparatus comprising:
   a face detection unit configured to detect a face of a person from an image;
   a storage unit configured to store dictionary data which holds information relating to faces and line-of-sight correction data corresponding to respective persons;
   an authentication unit configured to authenticate a person corresponding to the face detected by the face detection unit, using the information relating to faces in the dictionary data;
   a line-of-sight detection unit configured to detect information relating to a line of sight from the face detected by the face detection unit;
   a line-of-sight correction unit configured to correct the information relating to a line of sight detected by the line-of-sight detection unit, using the line-of-sight correction data in the dictionary data corresponding to the person authenticated by the authentication unit;
   a determination unit configured to determine whether a line of sight of a person serving as an object whose image is to be captured faces toward the image capturing apparatus, based on the information relating to a line of sight that is output from the line-of-sight correction unit; and
   an image capturing control unit configured control an execution of image capturing based on a result of the determination with the determination unit.

2. The image capturing apparatus according to claim 1, further comprising an organ detection unit configured to detect a facial organ from the face detected by the face detection unit; wherein the line-of-sight detection unit detects the information relating to a line of sight using positional information of the facial organ detected by the organ detection unit and averaged positional information of the facial organ.

3. The image capturing apparatus according to claim 1, wherein the line-of-sight detection unit detects, as the information relating to a line of sight, a direction of the line of sight or a likelihood that a direction of the line of sight matches a predetermined direction.

4. The image capturing apparatus according to claim 1, further comprising a registration unit configured to generate line-of-sight correction data based on the information relating to a line of sight detected by the line-of-sight detection unit, and register or update the generated line-of-sight correction data in said dictionary data.

5. The image capturing apparatus according to claim 4, wherein the dictionary data holds weighted average values of line-of-sight correction data corresponding to each of the persons; and the registration unit registers or updates, in the dictionary data, the information relating to a line of sight detected by the line-of-sight detection unit and weighted average values of the line-of-sight correction data in the dictionary data.

6. The image capturing apparatus according to claim 4, wherein the registration unit carries out the registration or update in the dictionary data if at least one of a state of the face detected by the face detection unit and the information relating to the line of sight detected by the line-of-sight detection unit satisfies a predetermined condition.

7. The image capturing apparatus according to claim 6, wherein the predetermined condition concerning a state of the face relates to at least one of an orientation of the face, a size of the face and an expression of the face detected by the face detection unit.

8. A processing method of an image capturing apparatus, the processing method comprising:
   detecting a face of a person from an image;
   authenticating a person corresponding to the detected face, using information relating to the face in dictionary data which holds information relating to faces and line-of-sight correction data corresponding to respective persons;
   detecting information relating to a line of sight from the detected face;
   correcting the information relating to the detected line of sight, using the line-of-sight correction data in the dictionary data corresponding to the authenticated person;
   determining whether a line of sight of a person serving as an object whose image is to be captured faces toward the image capturing apparatus, based on the information relating to a line of sight that is corrected; and
   controlling an execution of image capturing based on a result of the determination.

9. A non-transitory computer-readable storage medium storing a computer program that causes a computer to function as:
   a face detection unit configured to detect a face of a person from an image;
   a storage unit configured store dictionary data which holds information relating to faces and line-of-sight correction data corresponding to respective persons;
   an authentication unit configured to authenticate a person corresponding to the face detected by the face detection unit, using the information relating to faces in the dictionary data;
   a line-of-sight detection unit configured to detect information relating to a line of sight from the face detected by the face detection unit;
   a line-of-sight correction unit configured to correct the information relating to a line of sight detected by the line-of-sight detection unit, using the line-of-sight correction data in the dictionary data corresponding to the person authenticated by the authentication unit;
   a determination unit configured to determine whether a line of sight of a person serving as an object whose image is to be captured faces toward an image capturing apparatus, based on the information relating to a line of sight that is output from the line-of-sight correction unit; and
   an image capturing control unit configured control an execution of image capturing based on a result of the determination with the determination unit.

* * * * *